United States Patent [19]

Scholz

[11] 4,047,456
[45] Sept. 13, 1977

[54] MOTOR-DRIVEN SCREWING AND TRANSPORTING TOOL FOR REACTOR PRESSURE VESSEL HEAD RETAINING FASTENINGS

[75] Inventor: Manfred Scholz, Erlangen, Germany

[73] Assignee: Kraftwerk Union Aktiengesellschaft, Mulheim (Ruhr), Germany

[21] Appl. No.: 725,285

[22] Filed: Sept. 21, 1976

Related U.S. Application Data

[63] Continuation of Ser. No. 639,922, Dec. 11, 1975, abandoned.

[30] Foreign Application Priority Data

Dec. 17, 1974 Germany ............................ 2459645

[51] Int. Cl.² ............................................ B25B 29/02
[52] U.S. Cl. .................................................. 81/57.38
[58] Field of Search ..................... 81/57.38; 254/29 A

[56] References Cited

U.S. PATENT DOCUMENTS

| | | | |
|---|---|---|---|
| 3,722,332 | 3/1973 | Jones | 81/57.38 |
| 3,847,041 | 11/1974 | Meschonat et al. | 81/57.38 |
| 3,877,326 | 4/1975 | Kock et al. | 81/57.38 |

Primary Examiner—James L. Jones, Jr.
Attorney, Agent, or Firm—Kenyon & Kenyon, Reilly, Carr & Chapin

[57] ABSTRACT

The invention concerns a motor-driven screwing and transporting tool for tightening or loosening the threaded studs and associated tightening nuts of the head bolting of pressure vessels. After the tightening nuts are loosened or before they are tightened, the weight of the studs is taken over by rotating bearings that can be lifted, so that the studs with their tightening nuts can be screwed in or out, the screw threads of the studs being thus weight-relieved. The invention is intended primarily for nuclear reactor pressure vessels.

21 Claims, 6 Drawing Figures

MOTOR-DRIVEN SCREWING AND TRANSPORTING TOOL FOR REACTOR PRESSURE VESSEL HEAD RETAINING FASTENINGS

This is a continuation of application Ser. No. 639,922 filed Dec. 11, 1975, now abandoned.

BACKGROUND OF THE INVENTION

Various designs of motor-driven screwing and transporting tools for tightening or loosening the head bolting of pressure vessels are known. Such tools are known particularly for nuclear reactor pressure vessels, because in the case of nuclear reactor pressure vessels the problem arises to remove and then replace and tighten the head of the reactor pressure vessel quickly and safely, to minimize the radiation exposure of the personnel as much as possible during refueling. In nuclear reactor plants the shutdown time for refueling is influenced very substantially also by the time required for opening and closing the reactor pressure vessel. Here, the pressure vessel head is firmly bolted to the vessel proper via threaded studs which are sunk into the flange of the vessel, and associated tightening nuts on the upper side of the head.

A motor-driven screwing and transporting tool for loosening, transporting and tightening of individual tightening nuts of threaded studs is already known (German Offenlegungsschrift No. 2,061,037). As the loosening of individual closing or tightening nuts, the transporting and retightening in a definite order (to avoid asymmetrical stresses of the head and the pressure vessel) still requires relatively much time, thought has been given to the problem of pretensioning simultaneously several studs arranged in a pitch circle, to turn the associated vessel nuts up or down and to transport them forward and away. Thus, one known screw-tightening device (German Offenlegungsschrift No. 2,243,045) comprises the following elements: A support body which can be placed on the head flange, adjustably in height; tightening and loosening units mounted at the support body; means at the studs and their tightening nuts for coupling the tightening and loosening units and specifically, external teeth at the tightening nuts for the engagement of the drive pinion of a nut-rotating drive of the tightening and loosening units, and teeth arranged at the head end of the threaded stud for engagement of a gripper unit, wherein the tightening and loosening units comprise in turn the following components: A hydraulic tensioning cylinder, supported at the support body, for axially elongating the studs by axial action on the gripping units via a power piston during the loosening or tightening of the tightening nuts: a drive for coupling and decoupling the gripper body relative to the studs as well as said nut-turning drive with a drive pinion for turning the tightening nut in the direction of screwing it on or off via its external gearing.

Beyond this, it has also been proposed already to improve a motor-driven screwing and transporting tool of the kind described by loosening or tightening, as far as possible, all the tightening nuts of a head bolting, as well as transporting them to and fro, simultaneously. In this older arrangement, hydraulic plungers are already attached at the screwing and transporting tool, by means of which the distance of the tool from the surface of the head can be adjusted in accordance with the progress of the unscrewing and screwing operation.

SUMMARY OF THE INVENTION

The present invention is based on the consideration that it is desirable in pressure vessels in general, and in reactor pressure vessels in particular, to not only loosen, retighten and transport the rightening or closing nuts of the head bolts, as far as possible, automatically and in large numbers, but to include also the studs themselves in the operations, as then a number of important advantages with respect to time and space savings as well as safety for the operating personnel are obtained.

The subject of the invention now is a motor-driven screwing and transporting tool for tightening or loosening a head bolting comprising studs and associated tightening nuts of a pressure vessel, particularly a nuclear reactor pressure vessel, with a support body which can be placed on the flange of the head, adjustably in height; tightening and loosening units disposed at the support body; means at the threaded studs and their tightening nuts for coupling the tightening and loosening units; and specifically, external teeth at the tightening nuts for the engagement of the driving pinion of a nut-turning drive of the tightening and loosening units; and a thread arranged at the head end of the threaded stud, a gear arrangement or the like for the engagement of a gripper body, where the tightening and loosening units comprise the following components; hydraulic tensioning cylinders mounted at the support body for the axial elongation of the threaded studs by axial action on the gripper body via power pistons during the loosening or tightening of the tightening nuts; a drive for coupling and decoupling the gripper bodies relative to the studs; as well as said nut-turning drive with a driving pinion for turning the tightening nuts in the direction of unscrewing or screwing them via their external gearing.

The invention consists here of the feature that for screwing the threaded studs in and out, the tightening and loosening units are provided with lifting and support bearing means, which can be engaged and disengaged with respect to the studs, for a rotatable support which at the same time weight-relieves the corresponding screw threads of the stud and the pressure vessel at the base, and that the tightening and loosening units furthermore have a rotating drive which can be engaged with the studs in a positive, force-transmitting manner.

The advantages attainable with the invention are essentially the following: The threaded studs of a reactor pressure vessel can now be screwed out of the lower part of the reactor pressure vessel for each refueling. This permits in-service inspection of the studs at a suitable storage location away from the reactor pressure vessel as well as in-service tests of the tapped holes in the lower part of the reactor pressure vessel, which have become accessible after the studs are removed. Sealing the tapped holes in the lower part of the reactor pressure vessel is easier than sealing screws which remain in the lower part. The motor-driven screwing and transporting tool according to the invention requires a minimum of personnel for moving the studs and nuts, i.e., for unscrewing and screwing. The transporting of the threaded studs with their tightening nuts is possible in a highly mechanized and therefore, time-saving manner. In newly-to-be-built nuclear reactor plants, the level of the upper edge of the reactor room can be lowered, as through the removal of the studs, the cross-traveling height for the refueling machine is reduced. Through such a lowering of the level of the upper edge of the reactor room, the amount of flooding water required is reduced.

It is particularly advantageous if the tool is arranged for simultaneously unscrewing the threaded studs and the tightening nuts mounted on them, after the latter have been loosened, and for simultaneously screwing-in the studs and their tightening nuts before the latter are tightened, and that to this end the tightening nut can be secured at the threaded stud in such a manner that rotation of the tightening nut relative to the stud beyond a predeterminable screw-in ready position or a predeterminable readiness position rotation angle range is prevented in both directions of rotation. One preferred embodiment of the invention provides that the tool for the simultaneous tightening or loosening of all the bolting positions arranged on the pitch circle of the head bolting, comprises one tightening and loosening unit each for each threaded stud with tightening nut. One thereby avoids belt or chain drives, and the direct coupling of the drive motors is operationally reliable and without problems.

According to a further embodiment, the invention provides that the tool is arranged for transporting to and fro the unscrewed studs together with the tightening nuts mounted on them and can be brought into engagement for this purpose by means of support surfaces of its tightening and loosening units with corresponding counter-support surfaces of the stud. These support and counter-support surfaces are advantageously identical with the engagement surfaces by which the power piston of the hydraulic tensioning cylinders and the gripper body for turning the respective stud are in mutual engagement. If the tool according to the invention is equipped with a gripper body which can be screwed on the thread on the head side of the stud and is designed as a gripping nut with external teeth, then it is particularly advantageous if the lifting and support means comprise a lifting cylinder, arranged concentrically with the screwed-on gripping nut, with a lifting piston and a thrust bearing, wherein the lifting piston with an internal shoulder can be brought into engagement, via the thrust bearing, with an external shoulder of the gripping nut against the force of gravity. In this manner, the weights of the studs can be balanced hydraulically or pneumatically in fine dosages, and the thrust bearing provides advantageous rolling friction for the weight-compensated stud, so that the rotation drive for the stud has to supply relatively small torques. In this connection, a further embodiment of the tool, which has single-action tensioning pistions, provides that the lifting cylinder is arranged so as to follow the hydraulic tensioning cylinders in the axial direction and that the lifting piston is double-acting and can be brought into contact with the tensioning pistons as the resetting piston of the tensioning pistons in the direction opposed to that of its lifting direction. The multiple, and preferably double arrangement of hydraulic tensioning cylinders and associated power pistons in tandem is known per se from the German Auslegeschrift No. 1,271,050; this has the advantage that large lifting and tensioning forces can be obtained with a relatively small diameter.

BRIEF DESCRIPTION OF THE DRAWINGS

An example of an embodiment of the invention is illustrated in the accompanying drawings, in which.

DETAILED DESCRIPTION OF THE INVENTION

Figures 1, 3, 6:
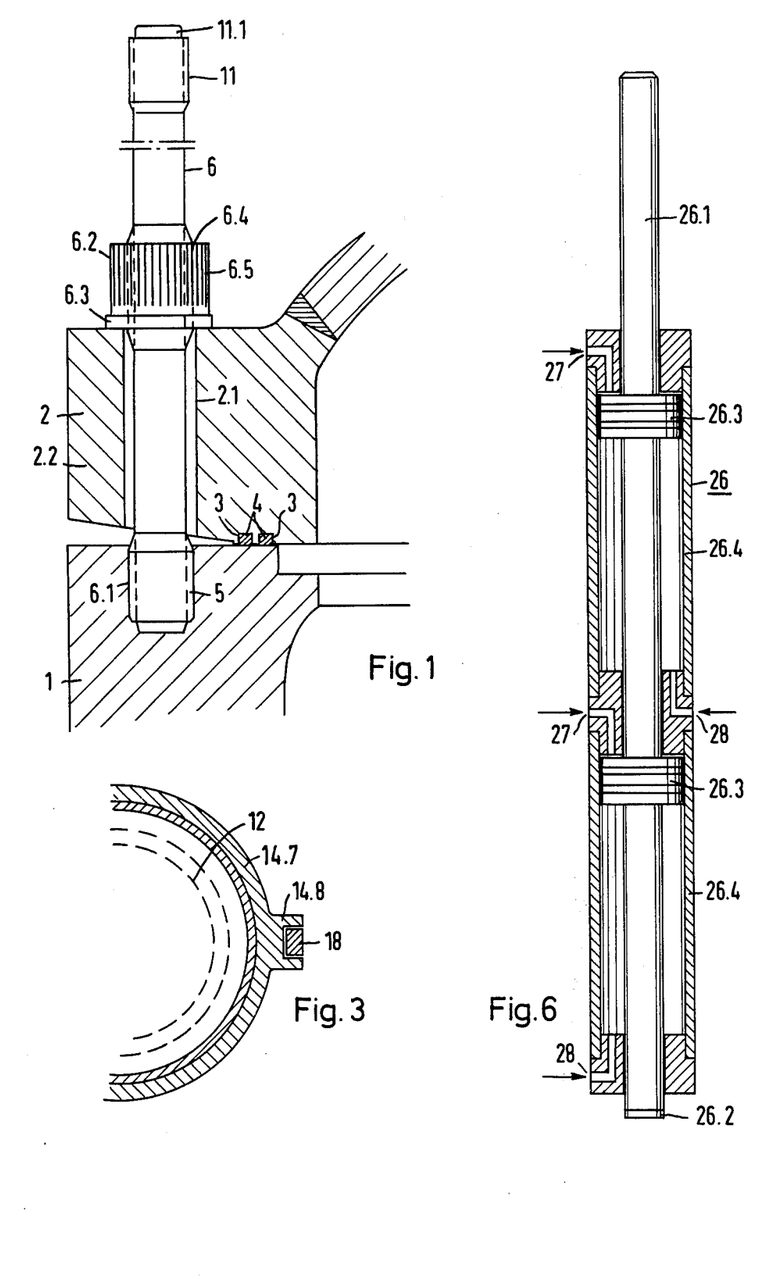
FIG. 1 is a vertical cross section of a portion of a reactor pressure vessel and its removable head and of one of the head-retaining studs and nuts.
FIG. 3 is a partial cross section taken on the line III—III in FIG. 2.
FIG. 6 is a vertical section of an individual lifting device, three of which are required to adjust the height of the tool.

The head bolting, shown in a partial view of FIG. 1, of a nuclear reactor pressure vessel (called RPV for short in the following) has a lower RPV part 1, to which the RPV head 2 is bolted tightly. For this purpose, two concentric sealing rings 4 are placed in circular slots 3 of the head 2, and threaded studs 6 are screwed by their lower threads 6.1 into the appropriate tapped holes 5; the stud shanks go through the head in appropriate head holes 2.1 and the head 2 is now clamped to the lower part 1 by the studs 6 and the tightening nuts 6.2 on spherical washers 6.3, in a sealed manner, as mentioned. To this end, the tightening nut 6.2 holds on the thread 6.4 of the stud 6, the shank of the stud 6 being subjected to an axial pretensioning force, which is about $765 \times 10^3$ kg per stud in the embodiment example shown. As will be explained later, the studs 6 are axially elongated hydraulically so that this pretensioning force can be attained, and in the elongated condition the tightening nuts 6.2 are then tightened, and for loosening the head bolting, the studs must also be stretched axially, of course, so that the tightening nuts 6.2 can be loosened. The maximum hydraulic pretensioning force per screw is about $900 \times 10^3$ kg. It is ensured by the above-mentioned large residual pretensioning forces that in the area of the seals 4 the required contact pressure for sealing the RPV is achieved. Even though only one stud is shown in FIG. 1, it is understood that for the head bolting of an RPV a multiplicity of such screws is provided which are arranged on a so-called pitch circle; in the embodiment example shown, there are 52 studs with the corresponding tightening nuts 6.2, holes 2.1 in the head flange 2.2 and tapped holes 5.

Figure 2:
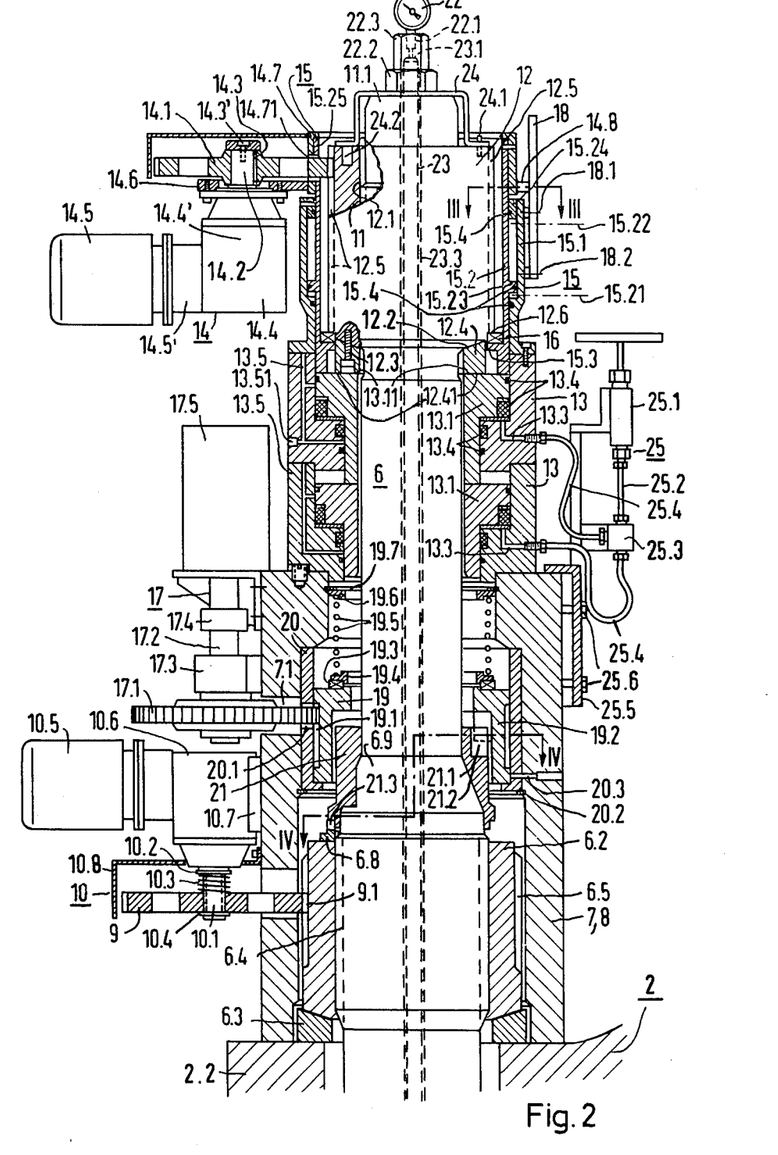
FIG. 2 is a vertical cross section on a scale enlarged over FIG. 1, showing a head-retaining stud with the tightening nut which is still screwed onto the stud, and on which the tightening and loosening unit of the motor-driven screwing and transporting tool according to this invention is placed.
Figure 5:
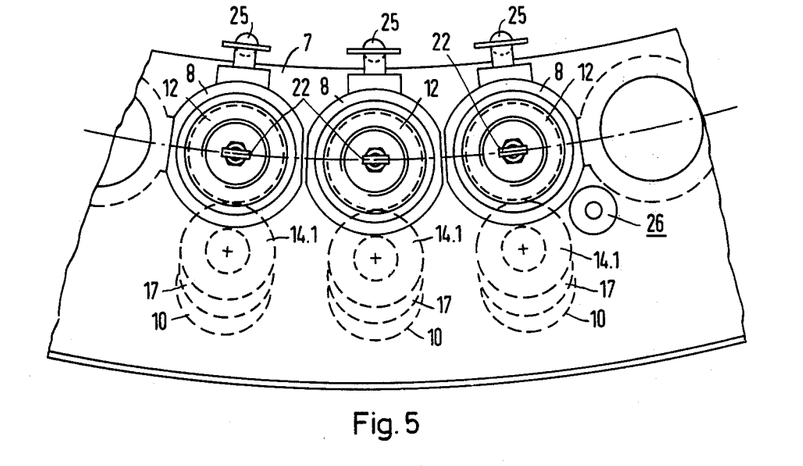
FIG. 5 is a top view of the example, showing the annular support body and three of the series of tightening and loosening units which side-by-side extend throughout the circumference of the support body.

FIG. 2 in conjunction with FIG. 5 now shows the details of the motor-driven screwing and transporting tool for tightening or loosening the head bolting of a pressure vessel, particularly an RPV, which comprises the studs 6 and associated tightening nuts 6.2. The tool comprises, first of all, an annular support body 7 which can be placed, adjustable in height, on the head flange 1 and has in the case shown a basically circular shape so as to match the pitch circle of the studs 6. At the support body 7 are disposed tightening and loosening units 8, by means of which the support body 7 can be placed on the respective studs 6 with tightening nuts 6.2; see particularly FIG. 5.

FIG. 2 shows one of the tightening and loosening units 8 which is put over a stud 6 with the tightening nut 6.2. Here, the tightening process for the stud 6 may have just been completed, or it could be just before the loosening process is started. The means at the studs 6 and their tightening nuts 6.2 for coupling the tightening and loosening units 8, comprise external gear teeth 6.5 on the tightening nuts 6.2 for the engagement of the drive pinion 9 of a nut-turning drive 10, and a thread 11 at the head end of the stud (see also FIG. 1) for the engagement of a gripper body 12, designed in the case shown as a gripping nut. In principle, other suitable gripping bodies may also be used instead of a gripping nut, e.g., two gripper jaws which can be brought into engagement hydraulically or pneumatically from two opposite sides with teeth or with circular slots and circular shoulders at the upper end of the stud 6, not shown here but as is known per se from Offenlegungsschrift No. 2,243,045. The gripping nuts shown, however, are particularly advantageous, as they fit in with the system of the tightening and loowening units particularly well. The gripping nuts have an internal thread 12.1 for the stud thread 11.

Each of the tightening and loosening units 8 comprises the following components: Hydraulic tensioning cylinders 13, mounted on the annular support body 7, for axially elongating the studs 6 by axial action on the gripping nuts 12, via power pistons 13.1, during the loosening or tightening of the tightening nuts 6.2. Two hydraulic tensioning cylinders 13 in tandem with the respective power pistons 13.1 are shown, whereby twice the tensioning force can be obtained with a given diameter, as compared to only one tensioning cylinder, for a given hydraulic pressure. The annular power pistons 13.1 surround the shank of the studs 6, and the upper power piston 13.1 attacks via a spherical washer 12.4 at a spherically bevelled shoulder 12.2 of the gripping nut 12, the spherical washer 12.4 being held at the spherical shoulder 12.2 of the gripping nut by means of screws 12.3 distributed over the circumference of the former. It is achieved thereby that the power pistons exert their pressure forces completely symmetrically on the gripping nut 12.

The tightening and loosening units 8 further comprise a drive 14 for coupling and decoupling the gripping nut 12 relative to the stud 6, with a drive pinion 14.1, which is mounted, secured against rotation, by means of the key 14.3 and the end thread 14.3', on the shaft 14.2; with a transmission unit 14.4 and the drive motor 14.5 proper, whose shaft, indicated at 15.5', is coupled with the shaft 14.4' of the transmission unit 14, for instance, via miter gears (not shown). The transmission unit 14 further contains a friction clutch, not shown, so that the drive pinion 14.1 is decoupled from the drive motor 14.5 if a maximum torque is exceeded, and the motor 14.5 idles. This is the case if the gripping nut 12 is fully tight. Instead of an electric motor 14.5, a hydraulic motor with associated pump or a pneumatic drive (not shown) can also be used. The drive pinion 14.1 meshes, as will be seen, with the external teeth 12.5 of the gripping nut 12. The mounting flange 14.6 of the transmission unit 14 is attached to the lifting piston 15 and is axially movable with the latter, as will be further explained below.

Part of the tightening and loosening unit 8 is further the nut-turning drive 10 with the drive pinion 9 which serves to turn the tightening nut 6.2 via its external gearing 6.5 in the screw-on and screw-off direction. The nut drive 10 is designed similar to the drive 14. The drive pinion 9, whose gear teeth 9.1 mesh with the external gear teeth 6.5 of the tightening nut 6.2, is supported on the shaft 10.1 spring-loaded in the axial direction, so that the engagement of the teeth 9.1 with the teeth 6.5 is facilitated when the tightening and loosening unit 8 is put in place, and jamming is avoided. To this end, there is securely mounted on the shaft 10.1 the washer 10.2, against which the helical compression spring 10.3 is braced and the drive pinion 9 pushes axially against a snap ring 10.4. The electric motor is designated with 10.5 and the transmission unit with 10.6. The transmission unit 10.6 is attached to the support body 7, for instance, via a U-shaped holder 10.7. 10.8 is a protective sheet-metal cover which is bolted to the support body 7 and covers the drive pinion 9 at the top.

For screwing the threaded studs 6 into and out of the tapped holes 5 of the lower RPV part 1 (see FIG. 1), the tightening and loosening units 8 are now provided with lifting and support means 15, 16 which can be switched into and out of engagement relative to the studs 6, to provide a support which is rotatable and in the process weight-relieves the screw threads 6.1, 5 of the stud 6 and the pressure vessel 1, respectively, associated with each other at the base end, and the tightening and loosening units 8 further comprise a rotation drive 17 which can be brought into engagement with the studs 6 in a positively force-transmitting manner. The weight of an individual stud 6 with the tightening nut 6.2 and the gripping nut 12 in the RPV shown, which is laid out for a power of 1200 MW$_{el}$, is about 2 tons or megaponds (2000 kg). The lifting means 15 are therefore employed for the screwing-in or out of the threaded studs 6 to generate a force compensating this weight, so that seizing between the screw threads 6.1, 5 is reliably prevented, the support means 16 providing for low friction, preferably rolling friction.

In detail, the lifting and support means 15, 16 are comprised of a lifting cylinder 15.1, which is arranged concentrically to the screwed-on gripping nut 12 and in which the annular lifting piston 15.2 is disposed, and of a thrust bearing 16, where the lifting piston 15.2 with an inner shoulder 15.3 can be brought into engagement with an outer shoulder 12.6 of the gripping nut 12 via the thrust bearing 16 against the direction of the force of gravity. As will be seen, the lifting cylinder 15.1 is arranged axially following the hydraulic tensioning cylinder 13, i.e., is flanged to the upper tensioning cylinder 13, and the lifting piston 15.2 is of double-action design, two hydraulic feed lines being indicated by the dash-dotted lines 15.21, 15.22. The lifting piston 15.2 can therefore be acted upon due to its piston shoulder 15.3, which respresents the effective hydraulic area, deflected upward via the line 15.21, or downward if acted upon via the line 15.22. The upward movement is limited by the stop ring 15.24, which is fastened at the upper circumference of the cylinder 15.1 on its inner side relative to the annular support 7. Sealing rings placed in slots are designated with 15.4 in the arrangement 15. The lower piston shoulder 15.3 can be brought to a stop with the upper of the power pistons 13.1, as can be seen, and can therefore serve as a restoring pressure piston for the power pistons 13.1 in the direction opposed to its lifting direction. The lifting piston 15.2 therefore has a dual function; for one, the weight relief of the parts previously noted, and secondly, the restoring function of these parts.

At the outer circumference of the lifting piston 15.2 there is fastened in an area left free by the lifting cylinder 15.1, the already mentioned drive motor 14 for the gripping nut 12, whose pinion 14.1 goes through the lifting piston 15.2 in a slot 15.25 to mesh with the gripping nut 12. Similarly, also the annular support frame 14.7 of the motor 14 is slotted at this point (slot 14.71). To take up the reaction torque of the drive motor 14, the annular frame 14.7, which is welded to the lifting piston 15.2, is guided in the axial direction by the guide bar 18, which is attached at the lifting cylinder 15.1 at 18.1 and 18.2. For this purpose, the annular frame 14.7 has a radially-directed guide bracket 14.8 of U-shaped cross section (see FIG. 3).

The rotation drive 17 is fastened to the support body 7 and is preferably a pneumatically energized drive-screw motor, whose drive pinion 17.1 is in engagement with a coupling member 19 which can be engaged and disengaged relative to the stud 6, the teeth 17.2 meshing with the external teeth 19.1 of the coupling member 19. To this end, the drive pinion 17.1 goes through the support body 7 in a slot 7.1 and the sleeve 20 inserted at the inside circumference of the support body 7, in a slot 20.1. The drive pinion 17.1 is mounted on the shaft 17.2, secured against rotation, which latter is supported in bearing elements 17.3 which are arranged at an axial distance from each other. The housing of the drive 17 is designated with 17.5; it contains the drive-screw motor proper, whose pneumatic feed lines are not visible.

The coupling member 19 is formed by a hollow cylindrical driving disk, for instance, which is supported concentrically and rotatably with respect to the stud 6 and axially spring-loaded in the support body housing, i.e., in the sleeve 20, with the external teeth 19.1 and internal teeth 19.2, which can be engaged with corresponding coupling projections and and recesses 21.1, 21.2 of a driving ring 21 which is connected with the stud 6, secure against rotation, although displaced longitudinally. The axially spring-loaded and rotatable support of the driving disk 19 is achieved by the thrust bearing 19.3 which rests via a support ring 19.4 and a helical compression spring 19.5 against a counter-support ring 19.6 with a retaining ring 19.7. If therefore the tightening and loosening units 8 are put over the respective associated stud 6, then the driving disk 19 can give way resiliently in the axial direction until its teeth 19.2 engage with the mating teeth 21.1, 21.2. A retaining ring for the sleeve 20 is designated with 20.2. The sleeve is furthermore pinned at 20.3 in the support body 7.

The entire screwing and transporting tool, i.e., its respective tightening and loosening units 8, are now arranged for simultaneously screwing-out the studs 6 and the tightening nuts 6.2 sitting on them after the latter have been loosened, and for simultaneously screwing-in the studs 6 and their tightening screws 6.2 before the latter are tightened. For this purpose, the tightening nut 6.2 can be locked to the stud 6 in such a manner that rotation of the tightening nut 6.2 relative to the stud 6 beyond a preselectable screwing-on readiness position or a preselected readiness-position rotation angle range, is prevented in both directions of rotation. For this purpose, the driving ring 21 has, at its end facing the tightening nut 6.2, a projection 21.3 with a stop surface pointing in the circumferential direction, and the tightening nut 6.2 is provided at its upper end face with a latch 6.8. This latch 6.8 can be attached at the end face of the tightening nut adjusted in such a manner that the nut 6.2, after traveling through a screw-off rotation angle which is equal to or larger than the angle of rotation required for loosening the nut 6.2 during the axial elongation of the stud 6, runs against the stop surface 21.3 with its latch 6.8. In the case shown in FIG. 2, the tightening nut 6.2 is still tight. If it is, therefore, stretched axially by the tensioning cylinder 13 and piston 13.1, and if the tightening nut 6.2 is turned by the drive pinion 9 counterclockwise, then the tightening nut 6.2 can travel through a screwing-off rotation angle which amounts to one full revolution, minus the arc of the projection 21.3 of the driving ring 21. This means, the pitch of the stud and tightening nut thread is chosen accordingly. In the present case, the thread is a metric thread M210 × 8. The pitch of 8 mm per thread is therefore sufficient for unscrewing the tightening nut 6.2, from which it is concluded that the axial elongation of the stud 6 in the permanent condition must be somewhat less than 8 mm. The driving ring 21 is designed as a separate part, which is, for instance, shrunk onto a corresponding shoulder 6.9 of the stud. This is advantageous because a certain amount of wear takes place at the part 21. However, the invention is not limited to this; special threaded studs can also be used which have an integrally formed driving ring 21.

Figure 4:
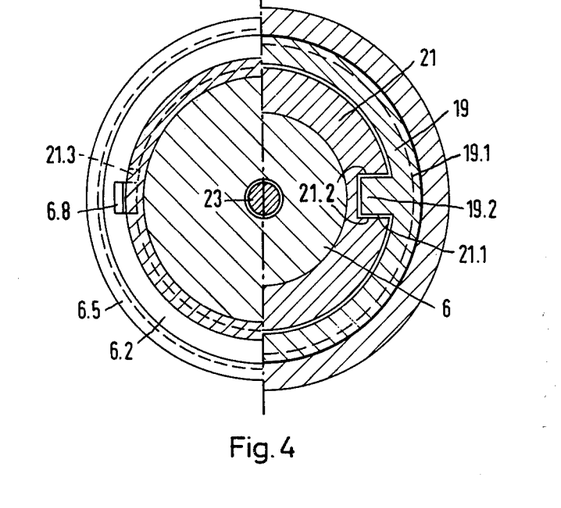
FIG. 4 is a cross section taken on the line IV—IV in FIG. 2.

The engagement between the latch 6.8 and the stop surface 21.3 as well as between the driving disk 19 and the driving ring 21 is illustrated once more in the cross-sectional view according to FIG. 4.

As shown particularly in FIG. 5, the tool according to the invention for the simultaneous tightening or loosening of all the screw connections arranged in the pitch circle 22 of the pressure vessel's head bolting, is equipped with one tightening and loosening unit 8 for each stud 6 with tightening nut 6.2. The tool is furthermore arranged for transporting to and fro the loosened studs 6 including the tightening nuts 6.2 sitting on them, and for this purpose can be brought into engagement, by means of support surfaces 13.11 of their tightening and loosening units 8, with corresponding counter support surfaces 12.41 of the stud 6. As will be seen, the support and countersupport surfaces 13.11, 12.41 are identical with the contact surfaces with which the power piston 13.1 of the hydraulic tensioning cylinders 13 and the gripping nut 12 for stretching the stud 6, are in mutual engagement.

During the hydraulic elongation of the stud 6, the elongation can be read at a dial gage 22, whose plunger 22.1 rests against the reference surface 23.1 of a measuring pin 23. This measuring pin 23, with which every stud 6 is provided, extends through a hole 23.2 into the interior of the stud 6 and therefore does not participate in the elongation of the stud 6. The mounting nuts for holding the dial gage 22 are designated with 22.2 and 22.3.

The bracket 24 serves, as known per se, for the purpose of securing against rotation. With its two angled-off ends, which made contact with the end face of the gripping nut 12, it is secured by the pin 24.1 and the threaded bolt 24.2. It prevents the gripping nut 12 from being turned off during the movement of the stud 6.

With 25 is designated as a whole a high-pressure hydraulic feeding arrangement. A hydraulic ring line, not visible, leads to the individual shut-off device 25.1 and from there fia the line 25.2 and the distributor head 25.3 as well as the lines 25.4 to the two tensioning cylinders 13, which are provided with corresponding hydraulic canals 13.3. Corresponding sealing rings between the piston 13.1 and the cylinders 13 are designated as a whole with 13.4. Oil-leak monitoring canals carry the reference symbol 13.5. The escape of leakage oil can be recognized at transparent, screwed-in caps 13.51. The mounting frame 25.5 for the hydraulic device 25 is bolted to the support body 7 at 25.6.

It should be added that the support body 7 with its tightening and loosening units 8 has hydraulic lifting devices 26 (FIGS. 5, 6), so that it can be placed, adjustable in height, on the flange of the RPV head or the lower part of the RPV. Preferably, three such lifting devices are arranged at three points uniformly distributed over the circumference of the support body 7. Each of these lifting devices has a push-off plunger 26.1 with a foot 26.2 and power pistons 26.3 which are mounted on the plunger and are arranged in corresponding hydraulic cylinder bodies 26.4. The feed canals 27 for high-pressure oil are associated with the upward movement of the support body or the downward movement of the power piston 26.3, and the hydraulic feed canals 28 are associated with the downward movement of the support body or the upward movement of the power pistons 26.3. The associated hydraulic feed lines for the high-pressure oil are not shown, and likewise not the specific manner of mounting the lifting device 26, which is set into corresponding recesses in the support body and are firmly connected with the latter. Through the tandem arrangement of two piston-cylinder units, as shown, a doubling of the effective pushing-off force is achieved, which must supply the weight of the entire screwing and transporting tool of approximately 35 tons plus the weight for the studs with the nuts. All three lifting devices 26 must be controlled synchronously in such a manner that uniform lifting or lowering of the tool is possible. In particular, fine adjustment by millimeters must also be possible.

The operation of the described screwing and transporting tool turns out as follows: It is assumed that the screwing and transporting tool in FIG. 2 is placed on the flange of the RPV head 2 for opening the RPV head. Thereupon, the high-pressure hydraulic system for the three lifting pistons 26 is switched on and the tool is lifted 3 mm by three lifting pistons. Next, the gripping nuts 12 located in the tool are screwed on all 52 studs (in FIG. 2, the already screwed-on position is shown), and specifically, on the thread 11, for which purpose the turning drive 14 with its drive pinion 14.1 is switched on. The spherical washer 12.4 at the gripping nut serves at the same time for guiding the gripping nuts 12 on the chamfered stud end 11.1, before the threads start to take hold. When the gripping nuts 12 are screwed on, the securing brackets 24 are snapped in place. Now, the tool is lowered again on the head flange 1 by actuating the lifting devices 26. Now, the studs must be stretched axially be pressurized oil, which is fed to the tensioning cylinders 13 via the lines 25.4. Then, the power pistons 13.1 are pushed first 3 mm in an idling stroke and then against the spherical washer 12.4, and the studs 6 are now stretched in a defined manner axially by the predetermined amount, which can be read at the dial gage 22. The gripping nuts therefore serve as the engagement surface for the power pistons.

Now, the nut-turning drives 10 can be switched on, which screw up without effort the respective tightening nuts 6.2 via the drive pinions 9 by almost a full turn, until the nuts are arrested by means of the locking device 6.8, 21.3. The hydaulic tensioning device 13, 13.1 is now again controlled so that the pressure drops slowly and the elongation of the studs is taken back. As the next step, pressure must be applied to the lifting cylinder 15, so that the weight of the studs 6 is compensated. When this has been accomplished, the drive-screw motors 17 are switched on and the studs 6 are screwed out step by step (the motors 17 may be of pulse operation), the support body 7 with the individual tightening and loosening devices being made to follow by means of the lifting devices 26. The drive-screw pulsed motors 17 unscrew the studs 6 together with their tightening nuts 6.2 and their gripping nuts 12, the drives 14 and 10 idling along, of course. After checking whether all the studs have been screwedout, the screwing and transporting tool is lifted up, if the finding is positive, by means of a building crane, not shown, and is run to a set-down location. Thereby, all the studs with their tightening nuts and gripping nuts are thus carried off. Through the holes 2.1 in the RPV head, one can now insert plastic plugs for sealing the blind tapped holes 5 in the lower RPV part, so that subsequently to the fliting of the head, the water-flooding of the reactor room can be started. The head is then taken off completely and refueling can begin which, however, is of no significance for the understanding of the present invention. It is importance, however, that the tool moved to the set-down location contains all studs and tightening nuts so that these can now be subjected to a thorough examination. Further, a close inspection of the blind tapped holes 6.1 can be performed with the RPV still open, which would not be possible without the removal of the threaded studs.

After the refueling and the inspection have been completed, the reactor pressure vessel is closed in the reverse order; after the head bolting has been tightened, the gripping nuts 12 can now be screwed off as the last step and are then carried with this tool to the set-down location.

What is claimed is:

1. A device for unscrewing and screwing nuclear reactor pressure vessel head-retaining nuts and screw studs, the studs extending upwardly through stud holes in a head flange of a removable head of a reactor pressure vessel, the studs having threaded lower ends screwed into threaded holes in the pressure vessel's top and threaded portions on which the nuts are screwed above the head flange to hold down the head on the pressure vessel with the studs under pretension between the vessel's top and the nuts, the nuts having external gear teeth for their rotation and the studs having upper ends spaced above the nuts; said tool comprising a support body and means for supporting said body at controllable heights on said head flange; and unscrewing and screwing units for said nuts and studs, mounted on said body and having axial passages for releasable insertion of the studs and nuts; each of said units for a stud and nut when inserted in the unit's passage, having a pinion releasably meshing with the nut's said gear teeth and means for reversingly driving said pinion for unscrewing and screwing movements of the nut on the stud; gripping means for releasably gripping the upper end of the stud above the nut, and means for applying upward force to said gripping means for stretching the stud upwardly from the pressure vessel's top to free the nut from said pretension during said movements; each of said units further having means for releasably engaging said reversibly rotating the stud so its said lower end can be unscrewed and screwed in the threaded hole in the pressure vessel's top while the nut remains screwed on the stud, and means for applying a lifting force to both the nut and stud to relieve the stud's said lower end from the weight of the nut and stud while being unscrewed and screwed in the pressure vessel's threaded hole.

2. The device of claim 1 in which each of said units have means for locking the nut against rotation relative to the stud's threaded lower end while this lower end is unscrewed from the threaded hole in the pressure vessel's top or screwed into said hole, after a limited rotation of the nut on said lower end, said limited rotation being insufficient to unscrew the nut completely from said lower end but sufficient to leave the nut in a free position when the nut is unscrewed during sketching and the sketching is released unscrewing from said pretension without said stretching of the stud, or to position the nut for said pretension without said stretching after release of said stretching.

3. The device of claim 1 in which said gripping means is for holding the stud's said upper end with the balance of the stud and the nut suspended therefrom in the unit's said axial passage, so that transport of the unit transports the stud and nut.

4. The device of claim 3 in which said support body has one of said units for each one of said head-retaining nuts and studs, the support body being removable from the pressure vessel's head so that after unscrewing of the stud's said lower ends, said tool can transport all of the studs with the nuts screwed thereon, from and to the pressure vessel's head.

5. The device of claim 3 in which said gripping means is formed by each of said upper ends of the studs being externally screw-threaded, and each unit having a rotative gripping nut and means for rotating this nut to screw it on the stud's upper end, the nut having an annular bottom thrust surface, said means for applying said upward force being formed by at least one annular piston and a cylinder therefor coaxially arranged as a part of the unit's said axial passage and through which said stud can be inserted, the annular piston having an upper end provided with a thrust bearing connecting with said gripping nut's said bottom surface and applying thereto said upward force.

6. The device of claim 5 in which said means for applying said lifting force comprises an annular lifting piston surrounding said gripping nut and having an internal flange engaging the nut's said annular bottom surface, and means for supplying said annular piston with fluid for forcing it both up and down.

7. A device for securing or releasing a connector capable of connecting a first member to a second member, the connector comprising a stud having a threaded end region and a threaded intermediate region, and an adjusting nut on the threaded intermediate region, the arrangement being such that, during connection, the stud extends through an aperture in the second member and is located at its threaded end region in a threaded hole in the first member, with the adjusting nut on that side of the second member remote from the first member and urging the second member towards the first member; the device comprising:

a support which is intended to be adjustable parallel to the axis of the stud, and, carried by the support:

1. means for gripping an end region of the stud remote from the said threaded end region;
2. means for axially extending the stud;
3. first drive means for rotating the adjusting nut relative to the stud;
4. second drive means for screwing and unscrewing the stud (and the adjusting nut carried thereon) relative to the first member; and
5. lifting means for taking up the weight of the stud and adjusting nut while they are being acted upon by the second drive means.

8. A device according to claim 7, wherein the means for gripping the remote end region of the stud is constituted by a gripping nut and drive for screwing and unscrewing the gripping nut on a threaded portion of said remote end region.

9. A device according to claim 8, wherein the lifting means is constituted by a cylinder disposed concentrically with the gripping nut and a piston disposed within the cylinder for the bearing against the gripping nut when acted upon by a pressure medium.

10. A device according to claim 9, wherein the drive for screwing and unscrewing the gripping nut is constituted by a motor coupled to a pinion which is engageable with the gripping nut through openings in the lifting cylinder and piston.

11. A device according to claim 9, wherein the piston is adapted to bear against a peripheral flange on the gripping nut by way of a thrust bearing.

12. A device according to claim 9, wherein the means for axially extending the stud is constituted by a clamping cylinder fixed to the support and a piston within said cylinder for bearing against a shoulder to be fixed to or provided on the stud, when acted upon by a pressure medium.

13. A device according to claim 12 wherein the piston in the clamping cylinder is intended to be acted upon by the pressure medium on one side only, while the piston of the lifting means is intended to be acted upon by its pressure medium on both sides, and the two pistons are linked together in such a way that the lifting piston may act as a drawback ram for the clamping piston in the direction in which pressure medium is not intended to act on the clamping piston.

14. A device according to claim 7, wherein the first drive means is constituted by a drive motor coupled to a pinion which is engageable with teeth on the periphery of the adjusting nut.

15. A device according to claim 7, wherein the second drive means is constituted by a drive motor coupled to a pinion which engages with a coupling member capable of coupling the pinion to the stud.

16. A device according to claim 15, wherein the drive motor of the said second drive means is a drive screw motor.

17. A device according to claim 15, wherein the coupling member is constituted by an annular ring mounted rotatably and axially resiliently within a housing intended to encircle the stud, the ring being provided with external teeth with which the pinion engages and at least one internal tooth capable of engaging with at least one corresponding projection or recess on a catch ring to be secured against rotation on the stud.

18. A device according to claim 12, further including a bearing surface fixed to the support for engaging with a corresponding counter-bearing surface to be fixed to or provided on the stud in order to transport the stud and associated adjusting nut to and from the site of the connection between the first and second members.

19. A device according to claim 7, wherein the means for gripping the remote end region of the stud is constituted by a gripping nut and drive for screwing and unscrewing the gripping nut on a threaded portion of said remote end region; the means for axially extending the stud is constituted by a clamping cylinder fixed to the support and a piston within said cylinder for bearing against a shoulder to be fixed to or provided on the stud, when acted upon by a pressure medium; and further including a bearing surface fixed to the support for engaging with a corresponding counter-bearing surface to be fixed to or provided on the stud in order to transport the stud and associated adjusting nut to and from the site of the connection between the first and second members, the counter-bearing surface being constituted by a portion of the gripping nut which also defines the shoulder, and the bearing surface being the same as that surface of the clamping piston by means of which it bears against the said shoulder.

20. A device according to claim 7, the device being adapted to secure or release a plurality of connectors simultaneously.

21. The combination according to claim 17, wherein the catch ring is provided with a projection and the adjusting nut is provided with a ratchet, whereby, after a predetermined angle of rotation of the adjusting nut relative to the stud, the ratchet bears against the projection.

* * * * *